C. T. ZOCHER.
ATTACHMENT FOR MEAT SLICING MACHINES.
APPLICATION FILED APR. 13, 1921.
1,427,710.
Patented Aug. 29, 1922.
3 SHEETS—SHEET 1.
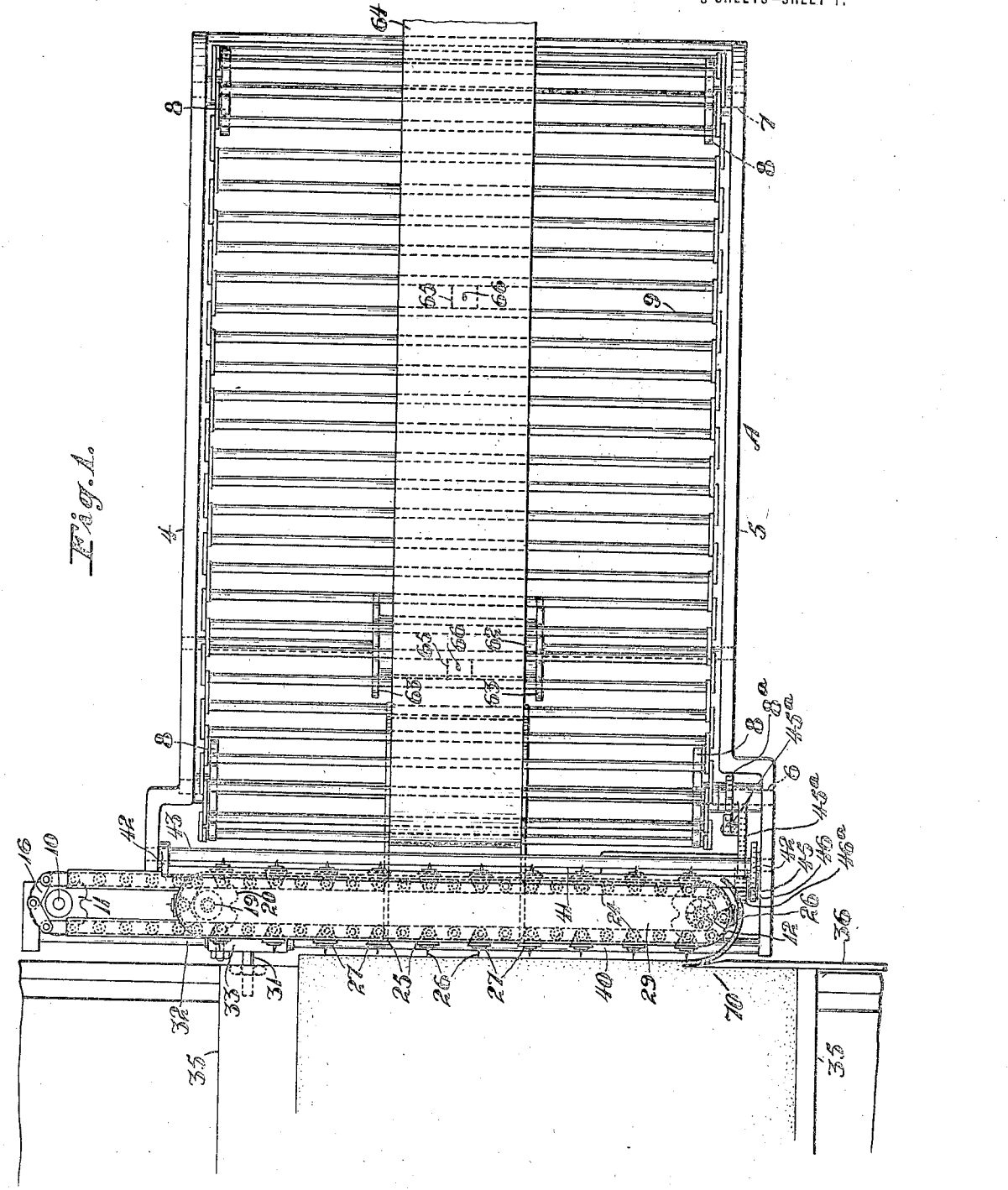
Inventor
Carl T. Zocher
By Chas. E. Townsend
Attorney

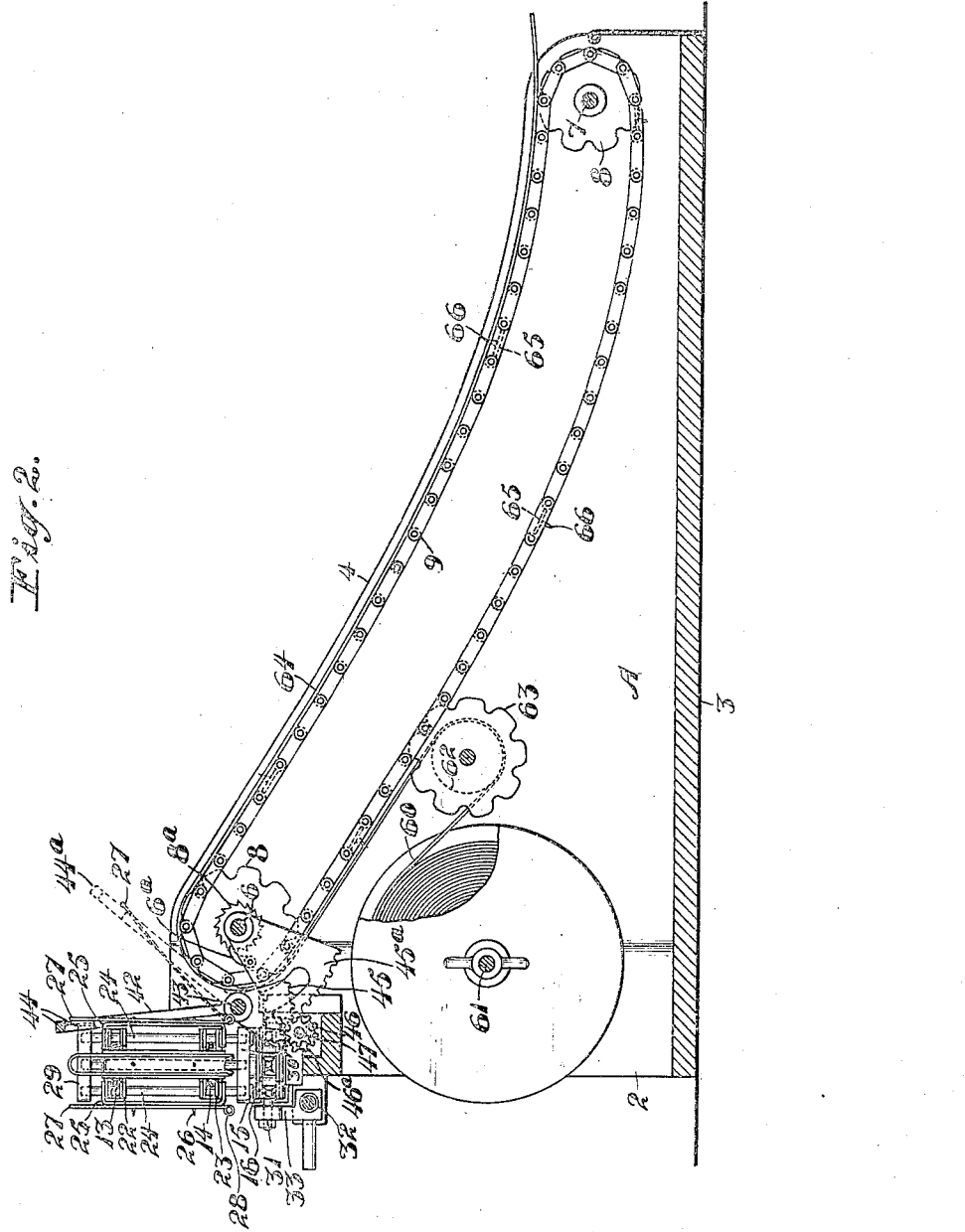

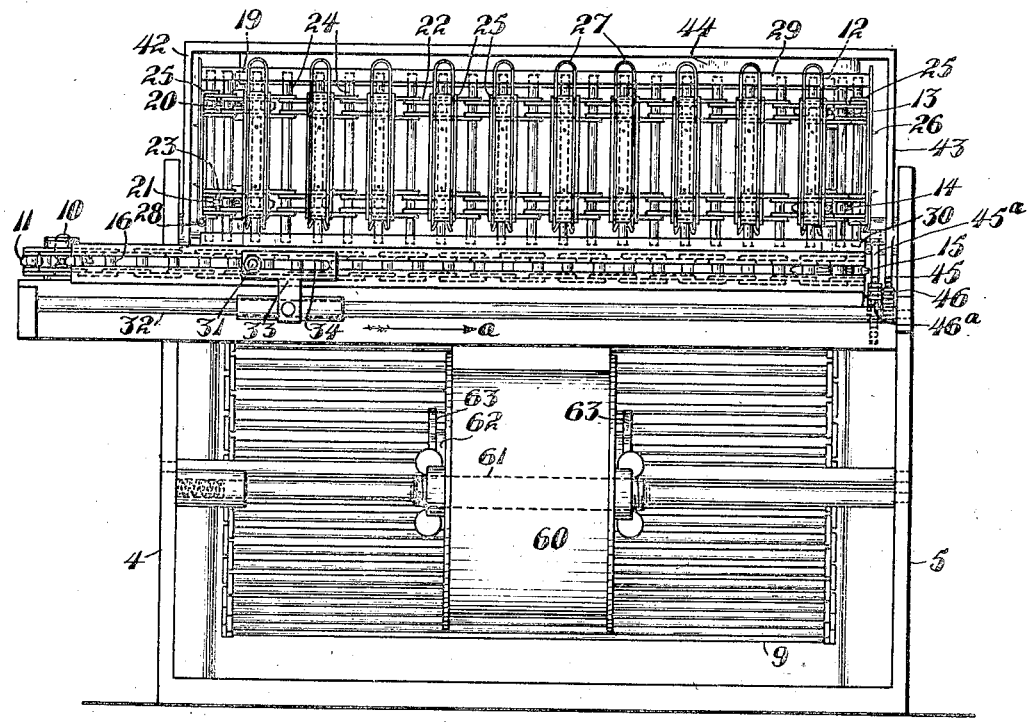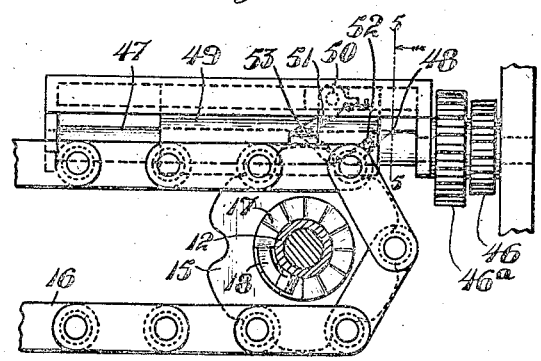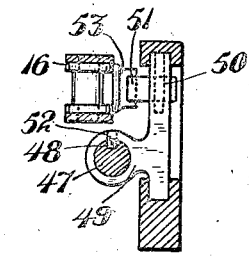

UNITED STATES PATENT OFFICE.

CARL T. ZOCHER, OF OAKLAND, CALIFORNIA.

ATTACHMENT FOR MEAT-SLICING MACHINES.

1,427,710.　　　　Specification of Letters Patent.　　Patented Aug. 29, 1922.

Application filed April 13, 1921.　Serial No. 461,096.

*To all whom it may concern:*

Be it known that I, CARL T. ZOCHER, a citizen of the United States, residing at Oakland, in the county of Alameda and State of California, have invented new and useful Improvements in Attachments for Meat-Slicing Machines, of which the following is a specification.

This invention relates to an attachment for meat slicing machines, and especially to a device for receiving, separating and displaying the meat when sliced.

The object of the present invention is to provide a device of the character described which is simple and substantial in construction, and which may be attached to practically any standard form of meat slicing machine in use today; further to provide a device which will handle the meat in a sanitary way, and which will receive, separate and display the meat when sliced.

Other objects will hereinafter appear.

The invention consists of the parts and the construction, combination and arrangement of parts as hereinafter more fully described and claimed, having reference to the accompanying drawings, in which—

Fig. 1 is a plan view of the machine.

Fig. 2 is a side elevation partially in section.

Fig. 3 is a rear end view of the machine.

Fig. 4 is an enlarged detail view of the mechanism whereby the meat stripping and transferring frame is actuated.

Fig. 5 is a cross section on line 5—5, Fig. 4.

Referring to the drawings in detail, A indicates in general a frame consisting of an end section 2, a base plate 3 and a pair of side frame sections 4 and 5. Journalled between said side frame sections and at the respective ends thereof is a pair of shafts 6 and 7. Secured on each shaft is a pair of interspaced sprocket wheels 8, and supported by said sprocket wheels is an endless link belt 9 of suitable construction. Journalled on the upper end of the frame section 2 is a short stub shaft 10, on which is secured a sprocket gear 11. Journalled at the opposite end of the frame is a vertically disposed shaft 12 and secured thereon are two sprocket gears 13 and 14. Turnably mounted on the shaft, below the sprocket gear 14, is a sprocket gear 15. This sprocket gear is in alignment with the sprocket gear 11 and these two sprocket gears carry an endless link chain 16. Formed on the upper face of the sprocket gear 15 is a ratchet gear 17, and pivotally mounted on a pin secured on the shaft 12 is a pawl through which driving movement is transmitted to shaft 12 when the gear 15 is turned in a certain direction. Disposed intermediate the shafts 10 and 12 is a third shaft as indicated at 19, and secured thereon is a pair of sprocket gears 20 and 21, which align with the respective sprockets 13 and 14. These sprockets, together with the sprockets 20 and 21, support a pair of interspaced parallel sprocket chains 22 and 23 which are connected by means of vertically disposed cross rods 24. The belt formed by the chains 22 and 23, together with the rods 24, is provided for the purpose of receiving the meat as discharged by the slicing knife and for delivering the same to the belt 9 as will hereinafter be described. Also secured to the endless belt formed by the chains 22 and 23 are vertically disposed plates 25. Secured on these plates are projecting pins 26 and secured on the lower ends of each plate are U-shaped spring arms 27 which straddle the respective pins 26. The lower ends of the U-shaped arms terminate in coils 28 to give the arms as much resiliency as possible. The rods 24, forming a part of the belt, pass within upper and lower guide tracks indicated at 29 and 30, and as such prevent any sag in the belt between the respective sprockets 20 and 21, and 13 and 14. Secured to the sprocket chain 16 is a rearwardly projecting pin 31. Disposed below the pin and the chain 16 is a guide rod 32, and slidably mounted thereon is a carriage 33, the upper end of which is slotted as at 34 to permit the pin 31 to project therethrough. The pin 31 is suitably attached to the meat supporting table of the meat slicing machine and as this table has a lateral movement with relation to the revolving knife 36 employed, it is obvious that a reciprocal movement will be transmitted to the carriage 33 and the endless sprocket chain disposed directly above the same; further that the movement of the chain 16 in one direction will be transmitted to the upper chain belt through means of the ratchet gear and pawl 18, and that the upper chain belt will remain stationary during reverse movement of the carriage. In the present instance simultaneous movement is transmitted from the carriage to the chain 16 and the upper belt when movement is imparted to the carriage in the direction of arrow a, see Fig. 3, but the upper chain belt remains stationary when reverse movement is transmitted to the chain 16 and the carriage 33. By again referring to Fig. 3, it will be seen that the upper end of the carriage is slotted and that the carriage is thus permitted a preliminary lateral movement before engagement is made with the pin and movement transmitted to the chain 16. This is of importance as it permits the meat slicing table 35 to move the meat into engagement with the knife 35 and force the forward end of the meat against the pins 26, see Fig. 1. Further movement of the carriage when the end of the slot is reached, causes the chain 16 to move and simultaneously the upper chain belt carrying the pins 26 as the pawl 18 is engaged when movement is transmitted in this direction. The meat to be sliced is thus forced against the pins of the upper chain belt and as this is travelling at the same speed as the meat supporting table, it is obvious that the entire slice will be forced against the pins and hung on the same, and further that as the chain belt rotates, the slices severed will be transferred from the side indicated at 40 to the side indicated at 41. In fact the entire slice will be transferred from one side to the other during the slicing operation, and as the chain belt remains stationary during the reverse movement of the chain 16 and the meat supporting table, it is obvious that there will be plenty of time to strip the slice from the pins and deposit it upon the belt 9. In fact the stripping and transferring of the slice takes place during the last portion of the movement of the meat supporting table and the chain 16. The stripping and transferring mechanism consists of a pair of arms 42 secured on a shaft 43. These arms carry a cross bar 44 which engages the upper ends of the U-shaped spring arms 26. The shaft 43 carries a segmental gear 45 which meshes with a pinion 46 secured on a shaft 47. This shaft is suitably journalled in the frame directly below the chain 16 and it has a spiral groove formed therein as indicated at 48, see Fig. 4. Slidably mounted in the frame, adjacent the shaft, is a carriage 49. Pivotally mounted on the carriage as at 50 is a pawl 51, and projecting from the carriage into the spiral groove 48 is a pin 52. Secured on the chain 16 is a lug 53. This lug engages the pawl 51 when the chain 16 has almost reached the end of its return movement, and it imparts a longitudinal movement to the carriage 49, thereby causing the pin 52 which projects into the spiral groove to transmit a rotary movement to the shaft 47. This movement is in turn transmitted through the pinion 46 to the segment 45 and thereby imparts a partial turning movement to the shaft 43 sufficient to swing the arms 42 and the cross bar 44 carried thereby from the full line position shown in Fig. 2 to the dotted line position indicated at $44^a$, see same figure. The cross bar will during this movement engage the upper ends of the spring arms 27 and bend them in a forward direction, and as these spring arms are U-shaped and straddle the pins 26, it is obvious that the meat slice supported by the pins will be stripped from the same and transferred and deposited upon the belt 9.

The movement of the cross bar and the arms 42 from the full line to the dotted position indicated takes place when the lug 53 engages the pawl 51, and the position indicated at $44^a$ is reached the moment the lug 53 begins to pass around the sprocket 15, or in other words at the time when it leaves the pawl 51. From this description it can be seen that rotary movement is transmitted to shaft 47 in one direction by engagement of the lug 53 with the pawl 51 as this engagement causes a longitudinal movement to be transmitted to the carriage 49. It is necessary of course that the carriage be returned to normal position, and similarly that the shafts 47 and 43 be re-rotated so that the arms 42 and the cross bar 44 will assume their normal position. This movement is automatically accomplished and is entirely actuated by the spring action of the arms 27, that is these arms will swing the cross bar and arms back to the full line position shown and will thus transmit a rotary movement to the shaft 43. This shaft in turn transmits turning movement to the shaft 47 through means of the segment 45 and the pinion 46, and the spiral groove will thus act as a cam or wedge to force the carriage back to normal position, where it is again ready to be actuated by the lug 53. Shaft 47 also supports a second pinion such as indicated at $46^a$. This pinion intermeshes with a segment $45^a$ which is loosely turnable on the shaft 6. The shaft 6 however carries a ratchet gear $8^a$, which is secured thereto and which is engaged by a pawl $6^a$ carried by the segment $45^a$. In other words simultaneous with the stripping and transferring action, forward movement is transmitted to the belt 9 and the advance movement is of course sufficient to permit the respective slices to be placed side by side for inspection, display, or otherwise.

To render the machine as sanitary as possible and to positively obviate the necessity of handling the slices when delivered to the belt 9, I provide means for automatically lining or covering the same with paper. This paper is delivered by means of a roll 60, carried by a shaft 61, and disposed below the upper end of the belt 9. The strip from the roll is passed over an idler 62 which is driven from the chain 9 by means of a sprocket gear 63. The paper strip is then passed under the belt 9 and then around and over the top of the same as indicated at 64. To prevent slipping of the lining paper, I provide a plurality of interspaced cross bars 65 on which are supported pins 66. These pins perforate the paper lining strip at intervals, thus forming a positive grip and preventing slipping or displacement of the same. This strip receives the slices one by one and may either serve as a means for removing the slices from the machine, and also for wrapping the same if desired.

In connection with the present machine it is desired to state that it is particularly adapted for attachment to slicing machines which employ a rotating cutter or knife 36. The meat to be sliced and indicated at 70 is supported and suitably secured on the table 35 which has a to and fro movement with relation to the knife 36. This is the most popular type of slicing machine in use today and is the type to which the machine forming the subject matter of the present invention is especially attached for attachment.

Having thus described my invention, what I claim and desire to secure by Letters Patent is—

1. The combination with a cutting knife and a meat supporting table movable laterally with relation thereto, of a frame supported adjacent the movable side of the table, an endless chain, sprocket wheels in the frame supporting said chain, means for transmitting movement from the meat supporting table to the chain to cause the same to travel in unison, an endless belt disposed in vertical alignment with and located above the latter, means actuated by the chain for transmitting movement to the belt in one direction, means carried by the belt for receiving the meat when sliced, an endless receiving belt, means for removing and transferring the meat slices from the first named belt to the receiving belt, and means actuated by the meat sliced transferring means for imparting an intermittent movement to the receiving belt.

2. The combination with a cutting knife and a meat supporting table movable laterally with relation thereto, of a frame supported adjacent the movable side of the table, an endless chain, sprocket wheels in the frame supporting said chain, means for transmitting movement from the meat supporting table to the chain to cause the same to travel in unison, an endless belt disposed above the chain in vertical alignment therewith, means actuated by the chain for transmitting movement to the belt in one direction, means carried by the belt for receiving the meat when sliced, an endless receiving belt, means for removing and transferring the meat slices from the first named belt to the receiving belt, means actuated by the meat sliced transferring means for imparting an intermittent movement to the receiving belt, and means for lining the receiving belt with a paper strip.

3. An attachment for meat slicing machines comprising a frame, an endless chain belt supported thereby, said chain belt being vertically disposed, a plurality of vertical bars on said belt, pins on each bar, and a stripping finger carried by each bar.

4. An attachment for meat slicing machines comprising a frame, an endless chain belt supported thereby, said chain belt being vertically disposed, a plurality of vertical bars on said belt, pins on each bar, a U-shaped spring finger carried by each bar and straddling the pins, means for transmitting an intermittent movement to the belt, and means for bending the U-shaped fingers in an outward direction to strip the meat from the pins and to transfer the meat to the receiving belt.

5. An attachment for meat slicing machines comprising an endless vertically disposed chain belt, means on said belt for receiving and retaining meat slices, means carried by and traveling with said belt for removing and transferring each meat slice, an endless receiving belt for the meat slices, means for transmitting an intermittent movement to the first named belt, and means for transmitting an intermittent movement to the endless receiving belt.

6. An attachment for meat slicing machines comprising an endless vertically disposed chain belt, means on said belt for receiving and retaining meat slices, means carried by and traveling with said belt for removing and transferring each meat slice, an endless receiving belt for the meat slices, means for transmitting an intermittent movement to the first named belt, means for transmitting an intermittent movement to the endless receiving belt, means on the receiving belt for retaining a paper lining applied thereto, and a roll journalled in the frame for supplying said paper lining.

7. An attachment for meat slicing machines comprising a frame, a pair of horizontally disposed sprocket wheels journalled therein, an endless chain carried by said wheels, a reciprocally mounted meat supporting table, means forming a driving connection between said table and the chain to cause the same to travel in unison, an endless meat receiving and displaying belt, an intermediate meat receiving belt disposed over the endless chain in vertical alignment therewith, means actuated by the first named endless chain for transmitting an intermittent movement to the intermediate meat receiving belt, means for transferring the meat from the intermediate belt to the display belt, and means for transmitting an intermittent movement to the display belt.

8. In a device of the character described the combination with the endless meat receiving belt and the endless meat receiving and displaying belt, of pins on the first named belt for receiving meat slices, U-shaped spring fingers straddling said pins and adapted to strip the meat therefrom, other means for actuating said fingers and for transferring the meat from one belt to the other, and a common driving mechanism intermittently operating the first named belt, the second named belt and the transferring means.

9. The combination with a meat slicer having a reciprocal meat supporting table, of an endless chain adapted to travel in unison with the table, a second endless conveyor adapted to be driven in one direction by the chain, pins on the second conveyor for receiving the sliced meat, U-shaped spring fingers on said conveyor straddling the pins, an endless receiving display belt, an oscillating bar associated with the spring fingers and adapted to actuate the same to remove the sliced meat from the pins, and means whereby actuation of the second named conveyor will oscillate said bar and impart intermittent advancing movement to the display belt.

10. An attachment for meat slicing machines, comprising a frame, an endless chain belt supported thereby, said chain being vertically disposed, a plurality of vertical bars on said chain belt, pins on each bar, and means carried by and traveling with the chain belt for stripping the meat from the pins.

11. An attachment for meat slicing machines, comprising an endless vertically disposed chain belt, means on said belt for receiving and retaining meat slices, means carried by and traveling with said belt for removing and transferring each meat slice, an endless receiving belt for the meat slices, means for transmitting movement to the chain belt, and means for transmitting motion to the endless receiving belt.

12. An attachment for meat slicing machines, comprising a frame, an endless chain mounted on said frame, a movable meat supporting table, means forming a loose connection between the table and the chain, an endless meat receiving and displaying belt, an intermediate receiving belt disposed over the endless chain in vertical alignment therewith, means for actuating said chain for transmitting an intermittent movement to the intermediate meat receiving belt, means for transferring the meat from the intermediate belt to the display belt, and means for transmitting an intermediate movement to the display belt.

13. The combination with a cutting knife and a meat supporting table, movable laterally with relation thereto, of a frame adjacent the table, a chain belt on the frame, a guide rod on the frame below the chain belt, a carriage slidable on said rod and having a slot therein, said chain belt having a pin projecting through said slot and attached to said table, whereby upon movement of the table motion is transmitted to the chain belt, an endless meat receiving belt, an endless meat receiving and displaying belt, means between the meat receiving belt and the displaying belt to transmit intermittent motion to the latter, and means for transferring the meat from the meat receiving belt to the endless displaying belt.

14. The combination with a cutting knife and meat supporting table, movable laterally with relation thereto, of a frame adjacent the table, a chain belt on the frame, a guide rod on the frame, a carriage slidable on said rod and having a slot therein, said chain belt having a pin projecting through said slot and attached to the table whereby upon movement of the table motion is transmitted to the chain belt, an endless meat receiving belt disposed above the chain belt, means including a ratchet mechanism between the chain belt and the meat receiving belt to transmit motion to the latter in one direction, means carried by the meat receiving belt to receive the meat when sliced, a sliced meat receiving means, and means for removing and transferring the meat slices from the meat receiving belt to the receiving means.

15. An attachment for meat slicing machines, comprising a frame, an endless chain mounted on said frame, a reciprocally mounted meat supporting table, means forming a driving connection between the table and the chain, an endless meat receiving and displaying belt, an endless belt mounted on the frame above the chain belt and shorter than the latter, and means for transferring the meat slices from the last mentioned belt to the receiving and displaying belt, and means for transmitting an intermittent movement to the latter belt to receive the meat slices one after another as they are transferred from the second mentioned belt to the receiving and displaying belt.

16. The combination with a cutting knife a meat supporting table movable laterally with relation thereto, of a frame adjacent the table, a chain belt on the frame, an operative connection between the table and the chain belt, an endless meat receiving belt disposed above the chain belt in vertical alignment therewith, means between said belts to transmit motion to the meat receiving belt as the endless chain belt is moved in one direction, a receiving and displaying means, and elements carried by and traveling with the meat receiving means for removing meat slices from the latter to the receiving means.

17. The combination with a cutting knife and a meat supporting table, movable laterally with relation thereto, an endless chain belt on the frame, a carriage interposed between the chain belt and the table and having a loose connection with the chain and the table to permit a preliminary lateral movement of the table and carriage before movement is transmitted to the belt, an endless meat receiving belt disposed above the aforesaid belt, an operative connection between said belts whereby to permit an intermittent movement to the second mentioned belt upon movement of the first named belt in one direction, an endless meat receiving and displaying belt, means for permitting an intermittent movement of the receiving and displaying belt in timed relation to the feeding movement of the meat receiving belt, and means for removing and transferring the meat slices from the meat receiving belt to the receiving and displaying belt.

18. The combination with a cutting knife, and a movable meat supporting table, a frame supported adjacent the table, an endless chain mounted on the frame, an endless meat receiving and carrying belt journaled on the frame, means between the chain and table whereby upon movement of the table in one direction causes movement in the chain in the same direction, means between the chain and belt causes movement of the latter with the chain, the chain being capable of reverse movement without reversing movement of the belt, an endless receiving and displaying means carried by the meat receiving and carrying belt to strip the meat slices from the latter, a shaft journaled in the frame, operating mechanism between the meat stripping means and the shaft, operating mechanism between the chain and shaft to partially rotate said shaft upon reverse movement of said chain to actuate the mechanism between the shaft and the meat stripping means to thereby actuate the latter to effect a transfer of the meat slices from the meat receiving and carrying belt to the receiving and displaying belt, said meat stripping means returning automatically to operative position and effecting both of said operating mechanisms to return the same and said shaft to operative position.

19. The combination with a cutting knife, and a movable meat supporting table, a frame supported adjacent the table, an endless chain mounted on the frame, an endless meat receiving and carrying belt journaled on the frame, means between the chain and table whereby upon movement of the table in one direction causes movement in the chain in the same direction, means between the chain and belt causes movement of the latter with the chain, the chain being capable of reverse movement without reversing movement of the belt, an endless receiving and displaying means carried by the meat receiving and carrying belt to strip the meat slices from the latter, a shaft journaled in the frame, operating mechanism between the meat stripping means and the shaft, operating mechanism between the chain and shaft to partially rotate said shaft upon reverse movement of said chain to actuate the mechanism between the shaft and the meat stripping means to thereby actuate the latter to effect a transfer of the meat slices from the meat receiving and carrying belt to the receiving and displaying belt, said meat stripping means returning automatically to operative position and effecting both of said operating mechanisms to return the same and said shaft to operative position, means for moving the receiving and displaying belt intermittently in timed relation with the meat receiving and carrying belt, and means for lining the receiving and displaying belt with a paper strip.

20. The combination with a cutting knife, and a movable meat supporting table, a frame supported adjacent the table, an endless chain mounted on the frame, an endless meat receiving and carrying belt journaled on the frame above the chain, means between the chain and table whereby upon movement of the table in one direction a similar movement is given the chain, means between the chain and meat receiving and carrying belt which causes movement of the latter with the chain when the chain is moved in one direction, the chain being capable of reverse movement without reversing the movement of the belt, a receiving and displaying belt, resilient arms carried by the meat receiving and carrying belt to strip the meat slices from the belt, a shaft journaled in the frame, means mounted on the shaft to actuate said resilient arms, a second shaft journaled in the frame, operating mechanism between said shafts to actuate the first shaft and the resilient arms when the second shaft is actuated, mechanism between the second mentioned shaft and the chain, whereby upon reverse movement of the chain a partial rotation is given said second shaft to actuate the first mentioned shaft and thereby operate the resilient arm actuating means to strip the meat slices from the meat receiving and carrying belt to the receiving and displaying belt, the resiliency of said arms automatically effecting return movement of the resilient arm actuating means and said shafts, and the mechanism between the same to normal operative position.

21. The combination with a cutting knife, and a movable meat supporting table, a frame supported adjacent the table, an endless chain mounted on the frame, an endless meat receiving and carrying belt journaled on the frame above the chain, means between the chain and table whereby upon movement of the table in one direction a similar movement is given the chain, means between the chain and meat receiving and carrying belt to cause movement of the latter with the chain when the chain is moved in one direction, the chain being capable of reverse movement without reversing the movement of the belt, a receiving and displaying belt, resilient arms carried by the meat receiving and carrying belt to strip the meat slices from the belt, a shaft journaled in the frame, means mounted on the shaft to actuate said resilient arms, a second shaft journaled in the frame, operating mechanism between said shafts to actuate the first shaft and the resilient arms when the second shaft is actuated, mechanism between the second mentioned shaft and the chain, whereby upon reverse movement of the chain a partial rotation is given said second shaft to actuate the first mentioned shaft and thereby operate the resilient arm actuating means to strip the meat slices from the meat receiving and carrying belt to the receiving and displaying belt, the resiliency of said arms automatically effecting return movement of the resilient arm actuating means and said shaft and the mechanism between the same to normal operative position, means for giving an intermittent movement to the receiving and displaying belt, and means for automatically supplying wrapping paper to the last mentioned belt.

22. An attachment for meat slicing machines, comprising a frame, an endless chain belt supported by the frame and provided with a laterally projecting lug, an endless meat receiving and carrying belt on the frame, means to slice the meat, means to remove the meat slicers from the meat receiving and carrying belt, a shaft journaled in the frame and having a spiral groove therein, a second shaft journaled on the frame, a pinion on the first mentioned shaft, a segment on the second mentioned shaft in meshing with said pinion, arms on the second mentioned shaft, a connection between the said arms, a carriage movable in the frame and having a pin operating in the spiral groove of said first mentioned shaft and also having a pawl, said pawl being engageable by the lug of the endless chain belt to shift said carriage to cause the pin of the latter to operate in the spiral groove of said first mentioned shaft to impart a partial turning movement to the first mentioned shaft to thereby partially rotate the second mentioned shaft to thereby swing said arms and the connection between them towards said meat slice removing means to actuate the latter to strip the sliced meat from the meat receiving and carrying belt.

23. An attachment for meat slicing machines, comprising a frame, an endless chain belt supported by the frame and provided with a laterally projecting lug, an endless meat receiving and carrying belt on the frame, means to slice the meat, means to remove the meat slicers from the meat receiving and carrying belt, a shaft journaled in the frame and having a spiral groove therein, a second shaft journaled on the frame, a pinion on the first mentioned shaft, a segment on the second mentioned shaft in meshing with said pinion, arms on the second mentioned shaft, a connection between the said arms, a carriage movable in the frame and having a pin operating in the spiral groove of said first mentioned shaft and also having a pawl, said pawl being engageable by the lug of the endless chain belt to shift said carriage to cause the pin of the latter to operate in the spiral groove of said first mentioned shaft to impart a partial turning movement to the first mentioned shaft to thereby partially rotate the second mentioned shaft to thereby swing said arms and the connection between them towards said meat slice removing means to actuate the latter to strip the sliced meat from the meat receiving and carrying belt, means to receive and display the sliced meat, and means for supplying a wrapping paper to said receiving and displaying means.

CARL T. ZOCHER.